2-OR 4-WIRE TELEPHONE SET
Filed Oct. 20, 1960
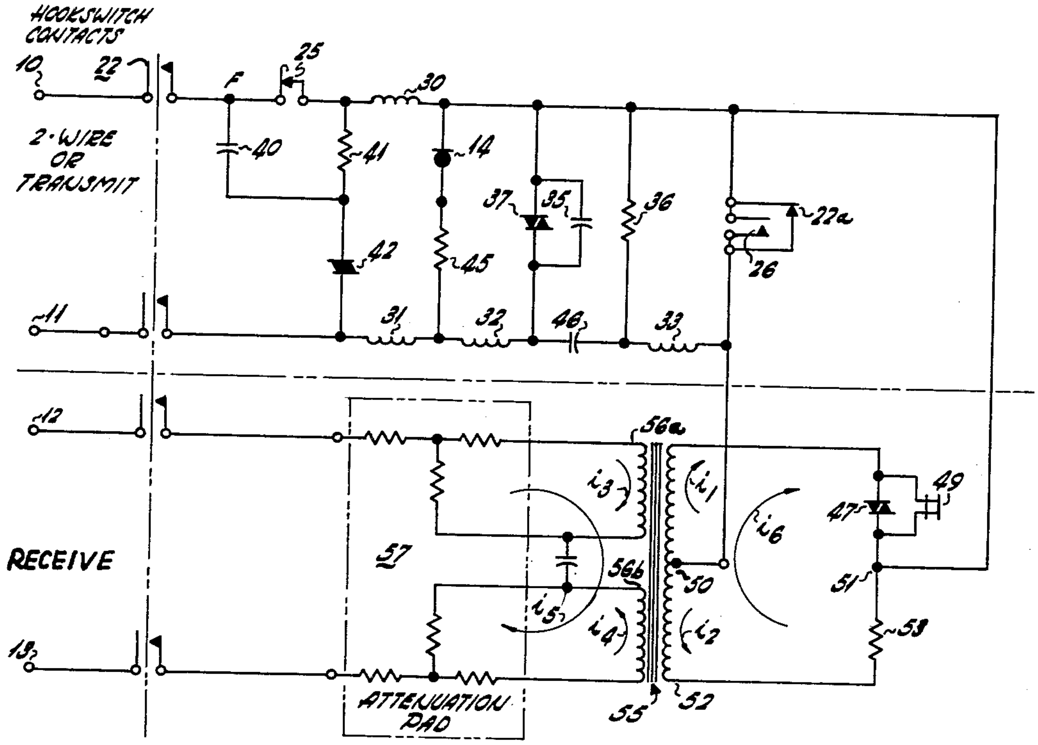
FIGURE 1
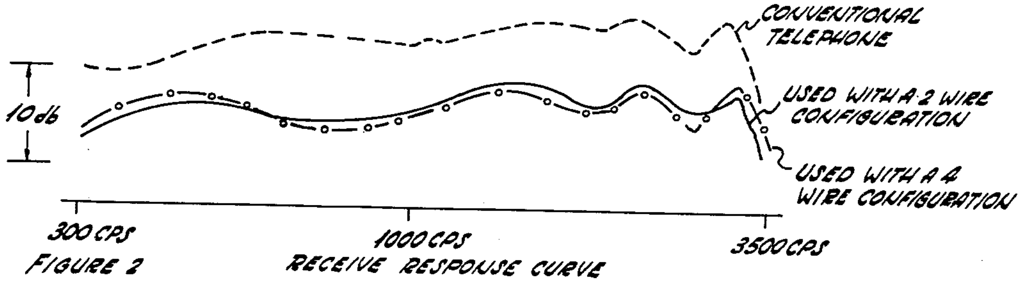
FIGURE 2 RECEIVE RESPONSE CURVE
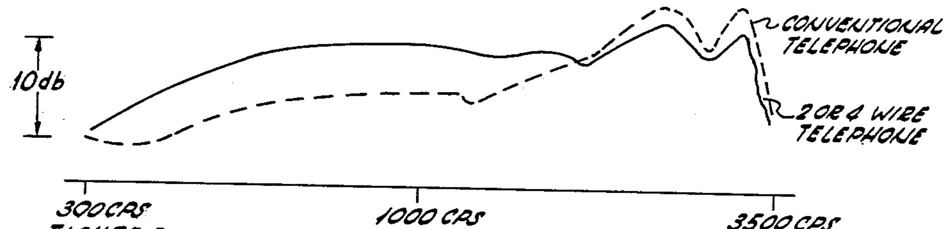
FIGURE 3 SIDE TONE LEVEL
| FREQUENCY | ATTENUATION |
|---|---|
| 300 CPS | 36.3 db |
| 1000 CPS | 35.3 db |
| 3500 CPS | 35.1 db |
ATTENUATION BETWEEN RECEIVE & TRANSMIT LINES
FIGURE 4
INVENTORS
THOMAS B. NORLING &
JOHN E. STEWART
BY
ATTORNEY 3,130,274

2- OR 4-WIRE TELEPHONE SET

Thomas B. Norling, Chicago, and John E. Stewart, La Grange, Ill., assignors to International Telephone and Telegraph Corporation, New York, N.Y., a corporation of Maryland Filed Oct. 20, 1960, Ser. No. 63,760
6 Claims. (Cl. 179—81)

This invention relates to telephone subscriber sets and more particularly to 2- and 4-wire telephone sets.

In the past, telephone sets (the instruments normally found on a subscriber's premises) have been connected to central office or other telephone equipment by way of either two-wire lines or four-wire lines. The telephone sets most commonly used in commercial telephone systems connect with the system over two wires or tip and ring conductors. Hence, these sets may be relatively low cost, mass produced articles. Heretofore it has not been possible to use these same telephone sets on four-wire lines; therefore, four-wire sets have been high cost, specially designed, low production items.

There have been other problems associated with four-wire telephone circuits which have tended to restrict their use despite their superior qualities. For example, since a first two of the four wires constitute a transmit channel and the second two of the four wires constitute a receive channel, it is necessary to prevent feedback from one channel to the other channel which would tend to cause circuit oscillations (sometimes called singing). Moreover, it is necessary to provide a normal amount of sidetone to enable a subscriber to hear his own voice when he is talking. In order to meet these two antithecal requirements, it has been necessary in the past to provide bridge configurations in four-wire subsets which eliminates the interchannel feedback that causes singing while supplying the sidetone.

Accordingly, an object of this invention is to provide a new and improved four-wire telephone subscriber set and more particularly to provide a subscriber set which may be used interchangeably with two- and four-wire telephone equipment.

Another object of this invention is to provide four-wire telephone circuits having the same characteristics as conventional two-wire telephone circuits while providing the normal amount of sidetone and preventing an inter-channel feedback.

Still another object of this invention is to reduce the cost of four-wire telephone circuits by making full use of existing low cost, mass produced two-wire circuits.

Yet another object of this invention is to provide a relatively simple four-wire applique circuit which may be incorporated into existing two-wire telephone sets at a minimum expense.

In accordance with one aspect of this invention, a relatively inexpensive applique circuit is packaged to fit into the housing of a standard commercial-type telephone set. This package includes in a closed loop series circuit comprising one winding of a center tapped repeat coil, a balance circuit, and a receiver. The other windings of the repeat coil are connected to a two-wire receive channel. The transmitter of a standard commercial telephone is connected to a two-wire transmit channel and also between the center tap and a junction between the receiver and a balance circuit. With this arrangement, voice signals originating in the transmitter are sent over the transmit channel and are split across the center tapped winding into two approximately equal currents, bucking against each other to prevent transfer across the repeat coil, thus reducing interchannel feedback. One of the split currents feeds through the receiver to provide sidetone. With the other windings of the repeat coil connected to the receive channel, a voice signal induced from the receive channel across the repeat coil is reproduced in the receiver as sound having substantially the same volume as sound reproduced from signals received over the two-wire line.

The above mentioned and other features and objects of this invention and the manner of obtaining them will become more apparent, and the invention itself will be best understood by reference to the following description of an embodiment of the invention taken in conjunction with the accompanying drawings wherein:

FIG. 1 is a schematic circuit diagram showing the telephone circuit of a two- and four-wire subscriber set;

FIG. 2 is a graph showing the response curve for the subject circuit used with either a two- or four-wire configuration as compared with the response curve of a conventional commercial telephone set;

FIG. 3 is a graph showing the relation between the sidetone level of the subject circuit and that of a conventional telephone set; and FIG. 4 is a table showing the attenuation between the receive and transmit channels.

A telephone network of a conventional modern, type 500, two-wire telephone subset is shown above the dot-dashed line of FIG. 1. An applique circuit which is built into the housing of the telephone set is shown below the dot-dashed line. When the telephone is connected to a two-wire system, a two-way communication channel is completed to such system over a pair of conductors (the usual tip and ring conductors) connected to terminals 10, 11. When the telephone set is connected to a four-wire system, the two wires of a transmit channel are connected to terminals 10, 11 and the two wires of a receive channel are connected to terminals 12, 13.

When the telephone circuit of FIG. 1 is used with a two-wire line, the circuit functions in a conventional manner which will be obvious to those skilled in the art and familiar with "500 type" telephones, one example of which is shown in U.S. Patent 2,629,783, granted to H. F. Hopkins, and assigned to Bell Telephone Laboratories, Inc.

The conventional two-wire subset network shown above the dot-dashed line includes a pair of terminals 10, 11 which may be connected to either a two-wire common battery central office in a well known manner, or to the terminals of a transmit channel. The substation includes as major components a transmitter 14, a receiver 49, hookswitch contacts 22, dial contacts 25, 26 and a four-winding induction coil 30–33. The number of turns in these windings is selected to provide a conjugate relation between the transmit and receive circuits. To balance the induction coil, a line-balancing circuit is provided including a capacitor 35, a resistor 36 and a varistor 37.

Conventional dial pulsing contacts 25 are in series with the line conductors and in parallel with a capacitor 40 and a resistor 41 which provide spark protection during dial pulsing. Dial off-normal contacts 26 shunt the receiver during dialing to prevent audible dial clicks. The varistor 42 offers a non-linear resistance which increases on relatively long loops with high impedance, and decreases on shorter loops with low impedance, thereby maintaining a fairly uniform impedance at the input of the subset network circuit.

The transmitter 14 is of conventional design and may include the well known carbon granular microphone elements. The resistor 45 is coupled in series with the transmitter to minimize variations in transmitter efficiency due to variations in the loop impedance not otherwise compensated by varistor 42. A capacitor 46 keeps direct current from reaching receiver 49 and a varistor 47 prevents excessive current flow through it.

Means are provided for splitting currents originating in the transmitter into equal and opposite currents which buck to prevent interchannel feedback and to provide sidetone. More particularly, when the circuit is connected to a four-wire line, voice signal currents originating at transmitter 14 flow through terminals 10, 11 to the transmit channel and also to points 50, 51 of a closed loop series circuit including a winding 52 of a repeat coil, a balancing resistor 53 and the receiver 49. At these points, the current splits or divides into two approximately equal and opposite currents $i_1$, $i_2$, one of which ($i_1$) flows through receiver 49 to cause sidetone. The signal which is induced across repeat coil 55 causes equal and opposite currents $i_3$, $i_4$ which buck in windings **56*a*, 56*b*. Therefore, very little, if any, signal current flows through terminals 12, 13 to the receive channel. On the other hand, when voice signals are received over terminals 12, 13 current $i_5$ flows through windings 56*a*, 56*b* in a single direction and induces a voice signal voltage across repeat coil 55 which also causes current flow in a single direction as indicated at $i_6$. This current produces a signal in receiver 49** which has substantially the same characteristics as the signal produced when the telephone set functions with a conventional two-wire system.

In the above described circuit, the resistor 53 is included merely to balance the impedance of the receiver to make the split currents $i_1$ and $i_2$ equal. In other applications, a monitor receiver may be substituted for resistor 53 to allow supervision or monitoring.

The applique circuit shown below the dot-dashed line includes, in addition to the above mentioned components, an attenuation pad 57 which attenuates signals received over the terminals 12, 13 so that a subscriber hears sounds at the same level of audibility regardless of whether the set is used with two- or four-wire lines. More particularly, when used with two-wire facilities, there is a loss of approximately one-half in the signal power at the receiver, since the current that is received over the two-wire line must be divided across what is essentially a hybrid network (windings 30–33). The attenuation pad 57 included in the receive channel causes a similar receive loss on four-wire operation.

For a graphic portrayal of the receive response characteristics, see FIG. 2 which shows a plot of frequency along the horizontal axis and of signal strength in db along the vertical axis. As there shown, an exemplary telephone circuit actually built in accordance with the teachings of this invention had substantially the same frequency response curve as that found in modern conventional telephones. Moreover, the frequency response was substantially the same when the phone was used with a two-wire configuration (the solid line curve) and with a four-wire configuration (the dot-dash line curve). It was found that the small differences in the receive response curve were not objectionable in most instances and further that, if necessary, an amplifier might be incorporated in the receiver circuit to correct for any differences which were objectional.

In the exemplary circuit actually constructed in accordance with this invention, there was slightly higher than normal sidetone at the low frequency end of the characteristic curve and slightly lower than normal sidetone at the high frequency end, as shown by the solid line curve of FIG. 3. Moreover, it was found that this minor deviation from normal sidetone did not in any manner cause an adverse effect upon users of the system.

In theory, the currents $i_1$ and $i_2$ emanating from transmitter 14 are completely isolated from the receive channel 12, 13 because they are equal and opposite, thus cancelling each other in windings **56*a*, 56*b*. In practice, however, it was found that there was some unbalance which caused current flow in the receive channel when a subscriber was talking into the transmitter 14**. As shown in FIG. 4, however, this current was attenuated in the receive channel by more than 35 db throughout the entire frequency spectrum, thus providing a high degree of isolation between the two channels and eliminating any oscillation problems.

It is thought that the advantages of the subject circuit will be readily apparent to those skilled in the art. First, the applique circuit shown beneath the dot-dash line of FIG. 1 may be built into existing mass produced, low cost, two-wire commercial telephone sets, thus eliminating the need for specially designed, high cost, low production four-wire sets. Moreover, the circuit may also be included with little or no added cost in conventional special purpose telephone sets, such as explosion-proof sets. Furthermore, the circuit may be used in connection with either common battery or local battery systems with known techniques.

It is to be understood that the foregoing description of a specific example of the invention is not to be considered as a limitation on its scope.

We claim:

1. A telephone set for use in connection with a four-wire telephone system, said telephone set comprising a conventional two-wire telephone set including a telephone network having a transmitter and a first pair of access terminals for making electrical connections to a two-wire line to provide two-way voice frequency transmission from said telephone set over said two-wire line to other telephone equipment, an adapter circuit installed in said conventional two-wire telephone set for adapting said set to connect with a four-wire line, a first two of said four-wires providing a transmit channel and a second two of said four-wires providing a receive channel, said adapter comprising a second pair of access terminals, means for connecting said first pair of access terminals to transmit voice frequency signals over said transmit channel and said second pair of access terminals to receive voice frequency signals over said receive channel, said adapter also comprising a repeat coil having a first winding connected to said two-wire receive channel, a series circuit including a receiver and a balancing means connected to a second winding of said repeat coil, and means for connecting said transmitter between a center tap on said second winding and a junction between said receiver and said balancing means.

2. A telephone set comprising a two-wire transmit channel, a two-wire receive channel, a substantially conventional two-wire telephone subset network connected to said transmit channel, whereby said telephone set may be used in conjunction with two-wire lines, a repeat coil having a first winding connected to said two-wire receive channel, a series circuit including a receiver and a balancing means connected to a second winding of said repeat coil, a transmitter, and means for connecting said transmitter between a center tap on said second winding and a junction between said receiver and said balancing means to reduce sidetone in said receiver and reduce voltages induced across the winding of said repeat coil by dividing current emanating from said transmitter into opposing currents which tend to cancel in said series circuit, whereby said telephone set may be used in conjunction with four-wire lines.

3. A telephone circuit comprising a telephone subset for connection with a conventional four-wire voice frequency telephone line, a first two of said four-wires comprising a transmit channel and a second two of said four-wires comprising a receive channel, said subset including a substantially conventional two-wire network including a transmitter, said network being connected to said two-wire transmit channel, an adapter circuit for installation in said subset comprising a repeat coil having a first winding connected to said two-wire receive channel, a closed loop series circuit including a receiver, a balancing means, and a second winding of said repeat coil, and means for connecting said transmitter between a center tap on said second winding and a junction between said receiver and said balancing means.

4. A telephone circuit comprising a telephone subset having a substantially conventional two-wire network, a two-wire transmit channel, said network being connected to said two-wire transmit channel, an adapter circuit for installation in said subset comprising a two-wire receive channel, a repeat coil having a first winding connected to said two-wire receive channel, means for controlling sidetone feedback in said subset and interchannel feedback comprising a closed loop series circuit including a receiver, a balancing means, and a second winding of said repeat coil, and means for connecting said transmitter between a center tap on said second winding and a junction between said receiver and said balancing means, said circuit values being such that current from said transmitter divides into two approximately equal parts, one part flowing through said receiver and one half of said second winding and the other part flowing through said balancing means and the other half of said second winding.

5. A telephone circuit comprising a transmit channel, a receive channel, a telephone subset network including a transmitter coupled to said transmit channel whereby signals originating at said transmitter are transmitted over said transmit channel, means including a receiver coupled to said receive channel whereby signals received over said receive channel energize said receiver, means also coupled to said transmitter for splitting current flow from said transmitter into two substantially equal and opposite currents, means for applying said split currents in bucking relation to said receive channel to attenuate signals transferred from said transmitter to said receive channel, and means for energizing said receiver by one of said split currents to provide sidetone.

6. A telephone circuit comprising a transmit channel, a receive channel, a telephone subset network including a transmitter coupled to said transmit channel, a receiver, means inductively coupling said receiver to said receive channel, means for splitting a portion of the current flow from said transmitter into two substantially equal currents, means for applying said split currents across said inductive means in bucking relation to attenuate transfer of signals from said transmitter to said receive channel, and means for energizing said receiver by one of said split currents to provide sidetone.

References Cited in the file of this patent

UNITED STATES PATENTS

| | | |
|---|---|---|
| 2,169,360 | Kimmel | Aug. 15, 1939 |
| 2,629,783 | Hopkins | Feb. 24, 1953 |
| 3,060,265 | Duncan et al. | Oct. 23, 1962 |
| 3,083,265 | Paulaitis et al. | Mar. 26, 1963 |

FOREIGN PATENTS

| | | |
|---|---|---|
| 738,029 | Germany | July 31, 1943 |